United States Patent
Guo

(10) Patent No.: US 11,036,820 B2
(45) Date of Patent: Jun. 15, 2021

(54) PAGE LOADING METHOD AND ELECTRONIC DEVICE

(71) Applicant: BEIJING KINGSOFT INTERNET SECURITY SOFTWARE CO., LTD., Beijing (CN)

(72) Inventor: Xionghui Guo, Beijing (CN)

(73) Assignee: BEIJING KINGSOFT INTERNET SECURITY SOFTWARE CO., LTD., Beijing (CN)

( * ) Notice: Subject to any disclaimer, the term of this patent is extended or adjusted under 35 U.S.C. 154(b) by 144 days.

(21) Appl. No.: 16/404,450

(22) Filed: May 6, 2019

(65) Prior Publication Data

US 2019/0361942 A1  Nov. 28, 2019

Related U.S. Application Data

(63) Continuation of application No. PCT/CN2017/106373, filed on Oct. 16, 2017.

(30) Foreign Application Priority Data

Jun. 27, 2017 (CN) .................. 201710501008.X

(51) Int. Cl.
*G06F 16/955* (2019.01)
*G06F 16/957* (2019.01)
(Continued)

(52) U.S. Cl.
CPC .......... *G06F 16/955* (2019.01); *G06F 16/957* (2019.01); *G06F 16/972* (2019.01); *G06K 9/6256* (2013.01)

(58) Field of Classification Search
None
See application file for complete search history.

(56) References Cited

U.S. PATENT DOCUMENTS

| 7,885,986 B2 * | 2/2011 | Anderson | G06F 16/9562 |
| | | | 707/805 |
| 2007/0128899 A1 * | 6/2007 | Mayer | G06F 9/4406 |
| | | | 439/152 |

(Continued)

FOREIGN PATENT DOCUMENTS

CN 107220094 A 9/2017

OTHER PUBLICATIONS

International Search Report issued in corresponding International Application No. PCT/CN2017/106373 dated Mar. 29, 2018 (2 pages).

(Continued)

*Primary Examiner* — Davoud A Zand
(74) *Attorney, Agent, or Firm* — Osha Bergman Watanabe & Burton LLP

(57) ABSTRACT

The present disclosure provides a page loading method and an electronic device. The method includes: collecting history browsing behaviors of a user during using a browser, and obtaining visited pages involved in the history browsing behaviors and browsing manners used by the user; training a learning model based on the visited pages and the browsing manners used by the user, such that the learning model learns a correspondence relationship between the visited pages and the browsing manners; in response to receiving a page visiting request, analyzing a target page to be visited based on the trained learning model, so as to determine a target browsing manner from the manner of browsing in a current tab and the manner of browsing in a new tab; and loading the target page according to the target browsing manner.

18 Claims, 4 Drawing Sheets

(51) Int. Cl.
*G06F 16/958* (2019.01)
*G06K 9/62* (2006.01)

(56) References Cited

U.S. PATENT DOCUMENTS

| | | | |
|---|---|---|---|
| 2009/0049077 A1* | 2/2009 | Lawlor | G06F 16/4393 |
| 2014/0279793 A1* | 9/2014 | Wohlstadter | G06N 5/04 |
| | | | 706/46 |
| 2015/0007065 A1* | 1/2015 | Krishnamoorthy | ............ |
| | | | G06Q 30/0202 |
| | | | 715/760 |
| 2015/0163311 A1* | 6/2015 | Heath | G06Q 30/0236 |
| | | | 709/204 |
| 2015/0350354 A1* | 12/2015 | Ji | H04L 67/22 |
| | | | 715/205 |

OTHER PUBLICATIONS

Written Opinion issued in corresponding International Application No. PCT/CN2017/106373 dated Mar. 29, 2018 (4 pages).

* cited by examiner

PAGE LOADING METHOD AND ELECTRONIC DEVICE

CROSS-REFERENCE TO RELATED APPLICATION

This application is a continuation of PCT/CN2017/106373, filed on Oct. 16, 2017, which claims priority to and benefits of Chinese Patent Application Serial No. 201710501008.X, filed on Jun. 27, 2017, by BEIJING KINGSOFT INTERNET SECURITY SOFTWARE CO., LTD., and titled with "Page loading method, apparatus, and electronic device", the entire contents of each of which are incorporated herein by reference.

FIELD

The present disclosure relates to an internet technology field, and more particularly to a page loading method and an electronic device.

BACKGROUND

With the development of Internet technology, browsers have become a part of people's lives. Through a browser can search, people can browse news, shopping and so on. When a user searches through a search engine, many search results that satisfy the search condition may be provided in the web page. When the user clicks on a certain search result, the browser may fixedly load the search result in the current tab, or fixedly load the search result in a new tab. It can be seen that the page loading manner of the browser in the related art is relatively simple.

SUMMARY

Embodiments of the present disclosure seek to solve at least one of the problems existing in the related art to at least some extent.

Embodiments of a first aspect of the present disclosure provide a page loading method, including: collecting history browsing behaviors of a user during using a browser, and obtaining visited pages involved in the history browsing behaviors and browsing manners used by the user; training a learning model based on the visited pages and the browsing manners used by the user, such that the learning model learns a correspondence relationship between the visited pages and the browsing manners, in which the browsing manners include a manner of browsing in a current tab and a manner of browsing in a new tab; in response to receiving a page visiting request, analyzing a target page to be visited based on the trained learning model, so as to determine a target browsing manner from the manner of browsing in a current tab and the manner of browsing in a new tab; and loading the target page according to the target browsing manner.

Embodiments of a second aspect of the present disclosure provide a page loading apparatus, including: a collecting module, configured to collect history browsing behaviors of a user during using a browser, and to obtain visited pages involved in the history browsing behaviors and browsing manners used by the user; a training module, configured to train a learning model based on the visited pages and the browsing manners used by the user, such that the learning model learns a correspondence relationship between the visited pages and the browsing manners, in which the browsing manners include a manner of browsing in a current tab and a manner of browsing in a new tab; an analyzing module, configured to analyze a target page to be visited based on the trained learning model in response to receiving a page visiting request, so as to determine a target browsing manner from the manner of browsing in a current tab and the manner of browsing in a new tab; and a loading module, configured to load the target page according to the target browsing manner.

Embodiments of a third aspect of the present disclosure provide an electronic device, including a housing, a processor, a memory, a circuit board, and a power circuit. The circuit board is arranged inside a space enclosed by the housing; the processor and the memory are disposed on the circuit board. The power circuit is configured to provide power for respective circuits or components of the electronic device. The memory is configured to store executable program codes. The processor is configured to run a program corresponding to the executable program codes by reading the executable program codes stored in the memory, so as to perform a page loading method according to embodiments of the first aspect of the present disclosure.

Embodiments of a fourth aspect of the present disclosure provide a non-transitory computer-readable storage medium, having stored therein computer programs that, when executed by a processor, perform a page loading method according to embodiments of the first aspect of the present disclosure.

Embodiments of a fifth aspect of the present disclosure provide a computer program product, configured to perform a page loading method according to embodiments of the first aspect of the present disclosure when instructions in the computer program product are executed by a processor.

BRIEF DESCRIPTION OF THE DRAWINGS

In order to explicitly illustrate technical solutions in embodiments of the present disclosure, a brief introduction for the accompanying drawings used when describing the embodiments will be listed as follows. Apparently, the drawings described below are only corresponding to some embodiments of the present disclosure, and those skilled in the art may obtain other drawings according to these drawings without creative labor.

DETAILED DESCRIPTION

Figure 1:
FIG. 1 is a schematic diagram illustrating effect of multi-tab displaying manner of a browser.

Reference will be made in detail to embodiments of the present disclosure. The same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

A page loading method, a page loading apparatus, and an electronic device according to embodiments of the present disclosure will be described below with reference to drawings.

Browsers may basically support multi-tab displaying mode in the related art. As illustrated in FIG. 1, multiple tabs may be displayed in one browser window. This allows the user to browse multiple webpages simultaneously and to dynamically switch between the multiple webpages.

Figure 2:
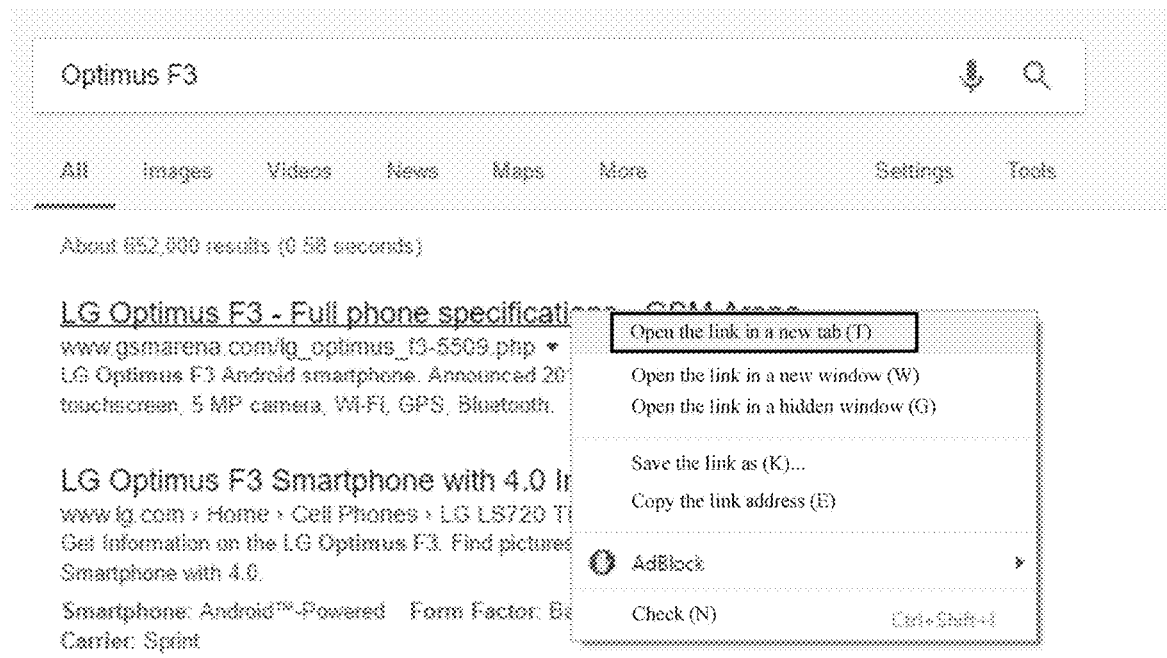
FIG. 2 is a schematic diagram illustrating a method of using a pop-up window to select to load a page in a new tab using.

For example, during using a search engine, a lot of search results satisfying a condition may be provided in a webpage simultaneously. At this time, it may need to open multiple webpages to browse and compare them. When the browser is set to fixedly load a page in a current tab, in order to open multiple webpages, as illustrated in FIG. 2, a search result may be clicked by a right button of a mouse when using a computer, "open a link in a new tab" is selected in a pop-upped dialog box, so as to realize that multiple tabs are displayed in one browser window. However, this way requires the user to create a new tab manually, which causes complex operations.

When the browser is set to load a page in a new tab, due to different usage habits, the user may close the original tab after the a page is loaded in the new tab. That is, the user is used to browsing on the original tab.

It can be seen that loading manner of the browser in the related art is relatively fixed, i.e., either loading the page in the original tab or loading the page in the new tab, which cannot be adaptively adjusted according to the user's usage habits.

For this problem, embodiments of the present disclosure provide a page loading method, to achieve training a learning model based on history browsing behaviors of a user during using a browser. When a page visiting request is received, a browsing manner is self-adaptively selected by using the learning model, and a page is loaded according to the selected browsing manner.

Figure 3:
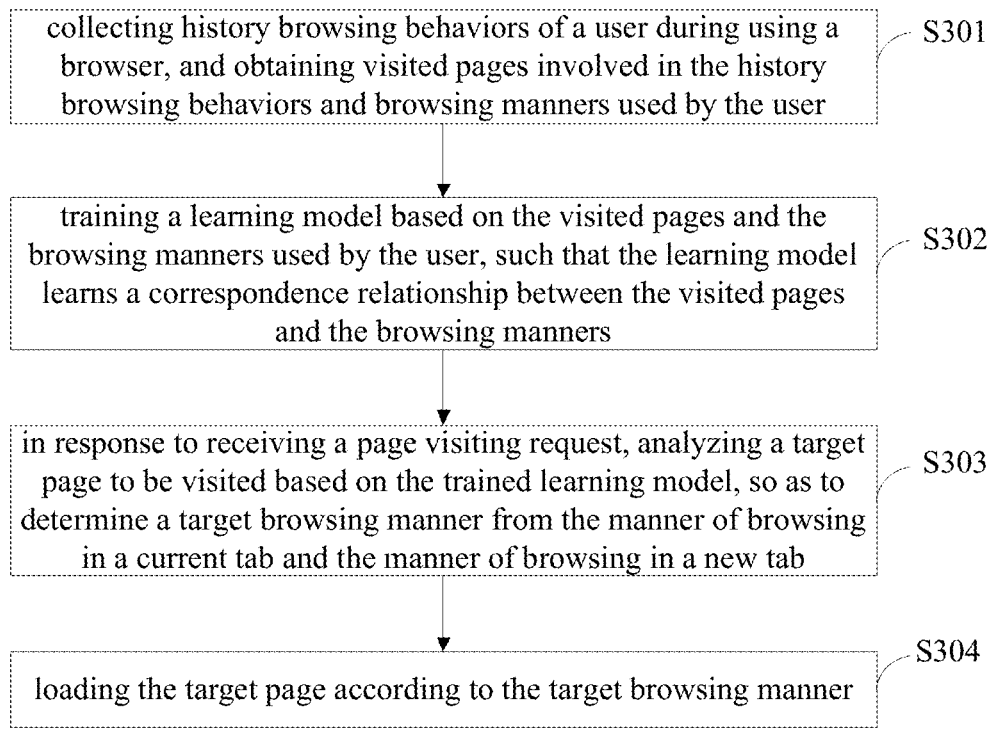
FIG. 3 is a flow chart of a page loading method according to an embodiment of the present disclosure.

FIG. 3 is a flow chart of a page loading method according to an embodiment of the present disclosure.

As illustrated in FIG. 3, the page loading method includes following actions.

At block S301, history browsing behaviors of a user during using a browser are collected, and visited pages involved in the history browsing behaviors and browsing manners used by the user are obtained.

When the user is using the browser, the history browsing behaviors of the user during using the browser may be recorded in the background by a program, to obtain the visited pages involved in the history browsing behaviors and the browsing manners used by the user. For example, the history browsing behaviors may include a time period of browsing a page, a Uniform Resource Locator (URL for short) of the visited page, content of the visited page, and the like.

The browsing manners include a manner of browsing in a current tab and a manner of browsing in a new tab. The manner of browsing in a current tab means that the browser loads the page in an original tab after the user clicks on a link. The manner of browsing in a new tab means that the browser loads the page in a new tab after the user clicks on a link.

At block S302, a learning model is trained based on the visited pages and the browsing manners used by the user, such that the learning model learns a correspondence relationship between the visited pages and the browsing manners.

In some embodiments of the present disclosure, visited pages involved in a plurality of history browsing behaviors are analyzed, and characteristic parameters of a plurality of visited pages are obtained. In detail, for each history browsing behavior, a URL of the visited page, content of the visited page, a URL of a related page of the visited page and/or content of the related page are obtained. The related page is a page loaded in the current tab and/or a page loaded in another tab before jumping from the current tab to the visited page.

For example, the user inputs "Ordinary world" in a home page of Taobao. After the user clicks on a search button, a plurality of search results are provided. The user clicks one of the plurality of search results. A page jumps from search results page to a new tab. In this history browsing behavior, a page loaded in the new tab is the visited page, and the search results page is the related page of the visited page. For this history browsing behavior, the URL of the visited page, the content of the visited page, the URL of the search results page, and the content of the search results page are obtained.

The characteristic parameters are generated based on the URL of the visited page, the content of the visited page, the URL of the related page of the visited page and/or the content of the related page.

After the visited pages involved in the plurality of history browsing behaviors are analyzed, the plurality of visited pages is characterized with the characteristic parameters, and each of the plurality of visited pages is labeled by using a corresponding browsing manner. For example, when the user browses news through People's network, the browser loads a piece of news in a new tab after the user clicks on a link of the piece of news. After the user completes browsing, the user clicks on a link of another piece of news. The browser opens the link of another piece of news in a new tab and closes original news page. At this time, the visited page is labeled as browsing in a current tab.

For another example, when the user browses a shopping website, such as Taobao, in order to compare commodities, the user may open a plurality of commodity links through a plurality of tabs in a browser window. For this situation, the visited page is labeled as browsing in a new tab.

After the plurality of visited pages are labeled, the plurality of labeled visited pages are taken as training samples, thus generating a training sample set. Then the learning model is trained using the training sample set. In some embodiments of the present disclosure, the learning model is a binary classification model, i.e., corresponding to browsing in a current tab and browsing in a new tab. The characteristic parameters of the plurality of training samples are input to the learning model successively, and an output of the learning model is the browsing manner, i.e., browsing in a current tab or browsing in a new tab.

In some embodiments of the present disclosure, the learning model is trained based on the obtained characteristic parameters of multiple dimensions, thus the output of the learning model is accurate.

At block S303, in response to receiving a page visiting request, a target page to be visited is analyzed based on the trained learning model, so as to determine a target browsing manner from the manner of browsing in a current tab and the manner of browsing in a new tab.

For example, the user clicks on a certain link in the browser at a certain time point. At this time, the browser receives the page visiting request. After the browser receives the page visiting request, the characteristic parameters of the target page to be visited is extracted. For example, the characteristic parameters of the target page may include a URL of the target page, a URL of a related page of the target page, or content of the related page. Then the characteristic parameters of the target page are input to the binary classification model for analysis. A browsing manner of the target page to be visited is determined based on the output of the binary classification model.

At block S304, the target page is loaded according to the target browsing manner.

If the output of the binary classification model is browsing in a current tab, the target page is loaded in a manner of browsing in a current tab. If the output of the binary classification model is browsing in a new tab, the target page is loaded in a manner of browsing in a new tab.

In order to improve intelligence of page loading, a number of times of browsing the target page in a new tab is counted based on the history browsing behaviors after the page receiving request is received. If the number of times satisfies a preset condition, for example, greater than a preset threshold or greater than several times of an average times of browsing in a new tab of all tabs, the user may be prompted, in a way of popping a prompting box, to open a smart multi-tab browsing manner. If the user selects to open the smart multi-tab browsing manner, after an instruction for allowing the user to open the smart multi-tab browsing manner is obtained, the smart multi-tab browsing manner is opened according to the instruction. Under the smart multi-tab browsing manner, the browser automatically creates a new tab after the user clicks on a link, and loads the page in the new tab.

For example, during a certain time period, when the user visits some particular websites, such as Taobao, Jingdong, and the like, the number of times of browsing in a new tab is greater than the preset threshold. When the user visits webpage in these websites next time, prompting box may be popped, to prompt the user whether to open the smart multi-tab browsing manner for the website. After an instruction of the user for allowing to open the smart multi-tab browsing manner is opened, the smart multi-tab browsing manner is opened, such that the new tab may be automatically created when the user clicks a link of the website.

With the page loading method according to embodiments of the present disclosure, by collecting the history browsing behaviors of the user during using the browser, the visited pages involved in the history browsing behaviors and the browsing manners used by the user are obtained, the learning model is trained based on the visited pages and the browsing manners used by the user, such that the learning model learns the correspondence relationship between the visited pages and the browsing manners, in which the browsing manners includes a manner of browsing in a current tab and a manner of browsing in a new tab, a target page to be visited is analyzed based on the trained learning model in response to receiving a page visiting request, so as to determine a target browsing manner from the manner of browsing in a current tab and the manner of browsing in a new tab, and the target page is loaded according to the target browsing manner. With embodiments of the present disclosure, by obtaining the visited pages and the browsing manners used by the user based on the history browsing behaviors of the user during using the browser, the learning model is trained by using the visited pages and the browsing manners used by the user, when the page visiting request is received, the target browsing manner of the page is determined based on the learning model, and the page is loaded according to the target browsing manner. This realizes that the browsing manner of the page is self-adaptively selected based on the learning model, and the page is loaded according to the selected browsing manner, thus solving a technical problem that manners of the browser loading the page in the related art are relatively fixed and single.

To achieve the above objectives, the present disclosure further provides a page loading apparatus.

Figure 4:
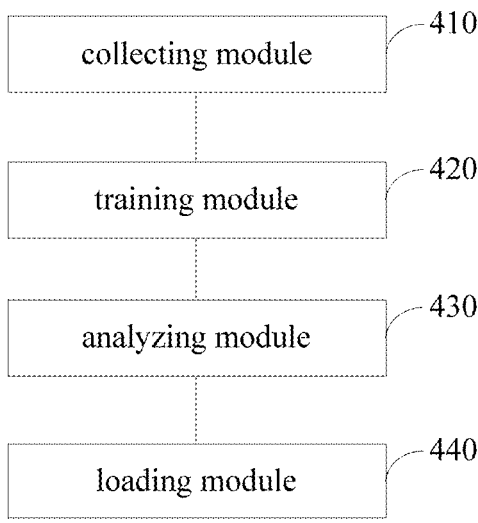
FIG. 4 is a block diagram illustrating a page loading apparatus according to an embodiment of the present disclosure.

As illustrated in FIG. 4, the apparatus includes the collecting module 410, the training module 420, the analyzing module 430, and the loading module 440.

The collecting module 410 is configured to collect history browsing behaviors of a user during using a browser, and to obtain visited pages involved in the history browsing behaviors and browsing manners used by the user.

The training module 420 is configured to train a learning model based on the visited pages and the browsing manners used by the user, such that the learning model learns a correspondence relationship between the visited pages and the browsing manners. The browsing manners include a manner of browsing in a current tab and a manner of browsing in a new tab.

The analyzing module 430 is configured to analyze a target page to be visited based on the trained learning model in response to receiving a page visiting request, so as to determine a target browsing manner from the manner of browsing in a current tab and the manner of browsing in a new tab.

The loading module 440, configured to load the target page according to the target browsing manner.

Figure 5:
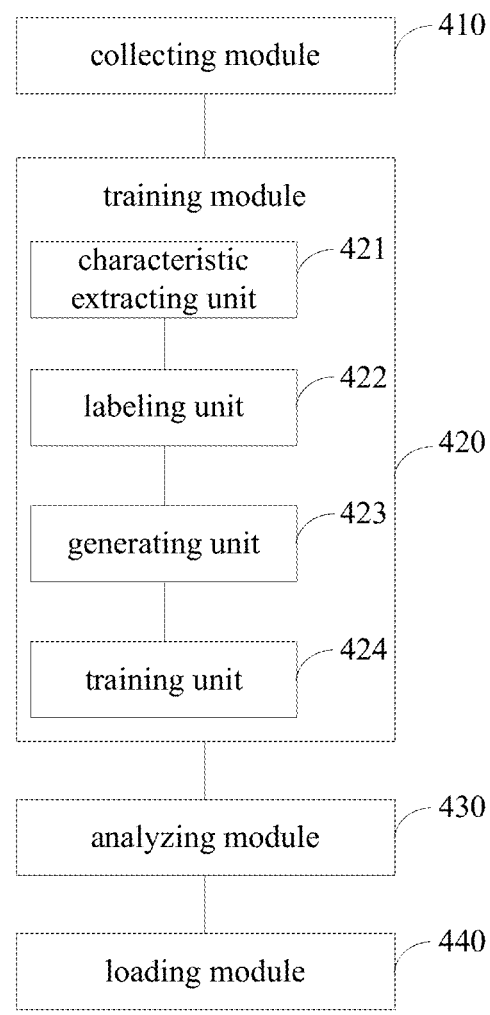
FIG. 5 is a block diagram illustrating a page loading apparatus according to another embodiment of the present disclosure.

In a possible implementation of the present disclosure, as illustrated in FIG. 5, the training module 420 includes a characteristic extracting unit 421, a labeling unit 422, a generating unit 423, and a training unit 424.

The characteristic extracting unit 421 is configured to analyze visited pages involved in a plurality of history browsing behaviors, and to obtain characteristic parameters of a plurality of visited pages.

The labeling unit 422 is configured to characterize the plurality of visited pages with the characteristic parameters, and to label each of the plurality of visited pages by using a corresponding browsing manner.

The generating unit 423 is configured to generate a training sample set based on the plurality of labeled visited pages.

The training unit 424 is configured to train the learning model using the training sample set. The learning model is a binary classification model.

The characteristic extracting unit 421 is configured to: for each history browsing behavior, obtain a URL of the visited page, content of the visited page, a URL of a related page of the visited page and/or content of the related page, in which, the related page is a page loaded in the current tab and/or a page loaded in another tab before jumping from the current tab to the visited page; and generate the characteristic parameters based on the URL of the visited page, the content of the visited page, the URL of the related page of the visited page and/or the content of the related page.

Figure 6:
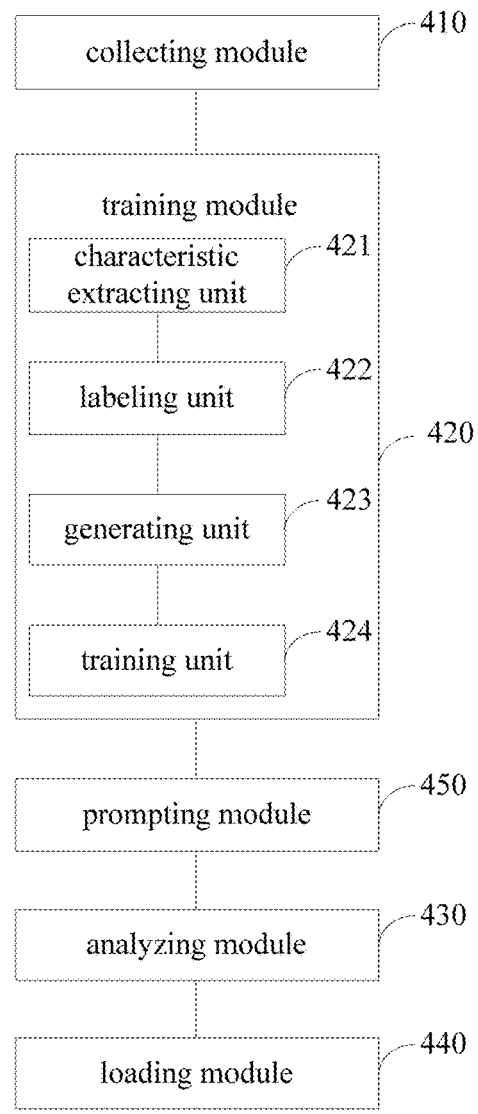
FIG. 6 is a block diagram illustrating a page loading apparatus according to yet another embodiment of the present disclosure.

Further, as illustrated in FIG. 6, the apparatus includes a prompting module 450.

The prompting module 450 is configured to count a number of times of browsing the target page in a new tab based on the history browsing behaviors, to prompt the user to open a smart multi-tab browsing manner in response to determining that the number of times satisfies a preset condition, and to obtain an instruction for allowing the user to open the smart multi-tab browsing manner.

It should be noted that, the foregoing explanation of the page loading method is also applicable to the explanation of the page loading apparatus in this embodiment, and details are not described herein again.

With the page loading apparatus according to embodiments of the present disclosure, by collecting the history browsing behaviors of the user during using the browser, the visited pages involved in the history browsing behaviors and the browsing manners used by the user are obtained, the learning model is trained based on the visited pages and the browsing manners used by the user, such that the learning model learns the correspondence relationship between the visited pages and the browsing manners, in which the browsing manners includes a manner of browsing in a current tab and a manner of browsing in a new tab, a target page to be visited is analyzed based on the trained learning model in response to receiving a page visiting request, so as to determine a target browsing manner from the manner of browsing in a current tab and the manner of browsing in a new tab, and the target page is loaded according to the target browsing manner. With embodiments of the present disclosure, by obtaining the visited pages and the browsing manners used by the user based on the history browsing behaviors of the user during using the browser, the learning model is trained by using the visited pages and the browsing manners used by the user, when the page visiting request is received, the target browsing manner of the page is determined based on the learning model, and the page is loaded according to the target browsing manner. This realizes that the browsing manner of the page is self-adaptively selected based on the learning model, and the page is loaded according to the selected browsing manner, thus solving a technical problem that manners of the browser loading the page in the related art are relatively fixed and single.

The present disclosure further provides an electronic device. The electronic device includes the page loading apparatus according to any one of above embodiments.

Figure 7:
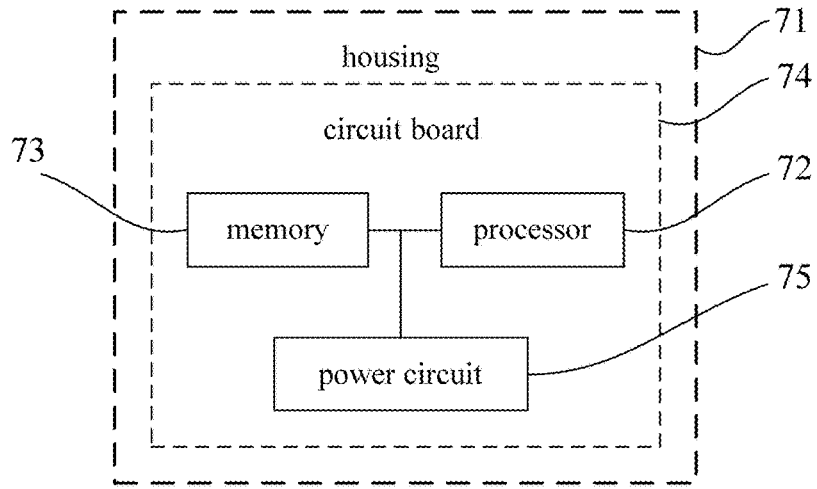
FIG. 7 is a schematic diagram illustrating an electronic device according to an embodiment of the present disclosure.

FIG. 7 is a schematic diagram illustrating an electronic device according to an embodiment of the present disclosure, which can implement the process in embodiments illustrated in FIG. 3. As illustrated in FIG. 7, the electronic device may include a housing 71, a processor 72, a memory 73, a circuit board 74, and a power circuit 75. The circuit board 74 is arranged inside a space enclosed by the housing 71. The processor 72 and the memory 73 are disposed on the circuit board 74. The power circuit 75 is configured to provide power for respective circuits or components of the electronic device. The memory 73 is configured to store executable program codes. The processor 72 is configured to run a program corresponding to the executable program codes by reading the executable program codes stored in the memory 73, so as to perform the page loading method according to any one of above embodiments.

Particular execution process of the above steps executed by the processor 72 and steps further performed through running executable program code by the processor 72 can refer to description of the embodiment illustrated in FIG. 3, which will not described in detail.

The electronic device may have various forms, including but not limited to follows.

(1) A mobile communication device: this typed device has a capacity of mobile communication, and has a main function of providing voice, data communication. This typed terminal includes a smart phone (such as an iPhone), a multi-media phone, a functional phone and a low-level phone.

(2) A super-mobile personal computer device: this typed device pertains to a personal computer having a capacity of computing and processing and generally having a capacity of accessing mobile Internet. This typed device includes: a PDA (Personal Digital Assistant), a MID (Mobile Internet Device) and UMPC devices (Ultra-mobile Personal Computer), such as an iPad.

(3) Portable entertainment equipment: this typed device may display or play multi-medium content. This typed device includes: an audio and/or video player (such as an iPod), a handheld game player, an E-book, intelligent playthings, and portable vehicle navigation equipment.

(4) A server: a device provides calculation service. The server consists of a processor, a hard disk, a memory, a system bus, etc. The server is similar to universal computer architecture. However, because of a need to provide highly reliable services, requirements for processing capacity, stability, reliability, security, scalability, and manageability and other aspects are high.

(5) Other electronic device having a capacity of data interaction.

To achieve above objectives, embodiments of the present disclosure provide a non-transitory computer-readable storage medium, having stored therein computer programs that, when executed by a processor, perform the page loading method according to above embodiments of the present disclosure.

To achieve the above objectives, embodiments of a fifth aspect of the present disclosure provide a computer program product, configured to perform a page loading method according to above embodiments of the present disclosure when instructions in the computer program product are executed by a processor.

Those skilled in the art shall understand that all or parts of the method of the above embodiments may be implemented by commanding related hardware via programs. The programs may be stored in a computer readable storage medium, and the programs comprise one or a combination of the method according to above embodiments of the present disclosure when the programs are executed. The storage medium may be a magnetic disc, an optical disc, a read-only memory (ROM), or a random access memory (RAM) etc.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases such as "in some embodiments,", "in an embodiment", "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples. Besides, any different embodiments and examples and any different characteristics of embodiments and examples may be combined by those skilled in the art without contradiction.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention, "a plurality of" means two or more than two, such as two or three, unless specified otherwise.

It will be understood that, the flow chart or any process or method described herein in other manners may represent a module, segment, or portion of code that comprises one or more executable instructions to implement the specified logic function(s) or that comprises one or more executable instructions of the steps of the progress. And the scope of a preferred embodiment of the present disclosure includes other implementations in which the order of execution may differ from that which is depicted in the flow chart, for example, in a substantially simultaneous order or in an opposite order, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

It would be understood by those skilled in the art that all or a part of the steps carried by the method in the above-described embodiments may be completed by relevant hardware instructed by a program. The program may be stored in a computer readable storage medium. When the program is executed, one or a combination of the steps of the method in the above-described embodiments may be completed.

In addition, individual functional units in the embodiments of the present disclosure may be integrated in one processing module or may be separately physically present, or two or more units may be integrated in one module. The integrated module as described above may be achieved in the form of hardware, or may be achieved in the form of a software functional module. If the integrated module is achieved in the form of a software functional module and sold or used as a separate product, the integrated module may also be stored in a computer readable storage medium.

The above-mentioned storage medium may be a read-only memory, a magnetic disc, an optical disc, etc. Although explanatory embodiments have been shown and described, it would be appreciated by those skilled in the art that the above embodiments cannot be construed to limit the present disclosure, and changes, alternatives, and modifications can be made in the embodiments without departing from scope of the present disclosure.

The above is just specific embodiments of the present disclosure, but the scope of the present disclosure is not limited thereto, and any person skilled in the art can easily think of changes or substitutions within the technical scope of the present disclosure. All should be covered by the scope of the present disclosure. Therefore, the protection scope of the present disclosure should be determined by the scope of the claims.

What is claimed is:

1. A page loading method, comprising:
   collecting history browsing behaviors of a user during using a browser, and obtaining visited pages involved in the history browsing behaviors and browsing manners used by the user;
   training a learning model based on the visited pages and the browsing manners used by the user, such that the learning model learns a correspondence relationship between the visited pages and the browsing manners, wherein the browsing manners comprise a manner of browsing in a current tab and a manner of browsing in a new tab;
   in response to receiving a page visiting request, determining a target browsing manner for the target page from the manner of browsing in a current tab and the manner of browsing in a new tab by analyzing the target page to be visited based on the trained learning model; and
   loading the target page according to the target browsing manner.

2. The method according to claim 1, wherein training the learning model based on the visited pages and the browsing manner used by the user comprises:
   analyzing visited pages involved in a plurality of history browsing behaviors, and obtaining characteristic parameters of a plurality of visited pages;
   characterizing the plurality of visited pages with the characteristic parameters, and labeling each of the plurality of visited pages by using a corresponding browsing manner;
   generating a training sample set based on the plurality of labeled visited pages; and
   training the learning model using the training sample set, wherein the learning model is a binary classification model.

3. The method according to claim 2, wherein analyzing visited pages involved in the plurality of history browsing behaviors and obtaining characteristic parameters of the plurality of visited pages comprising:
  for each history browsing behavior, obtaining a URL of the visited page, content of the visited page, a URL of a related page of the visited page and/or content of the related page, wherein, the related page is a page loaded in the current tab and/or a page loaded in another tab before jumping from the current tab to the visited page; and
  generating the characteristic parameters based on the URL of the visited page, the content of the visited page, the URL of the related page of the visited page and/or the content of the related page.

4. The method according to claim 1, before analyzing a target page to be visited based on the trained learning model so as to determine a target browsing manner from the manner of browsing in a current tab and the manner of browsing in a new tab, further comprising:
  counting a number of times of browsing the target page in a new tab based on the history browsing behaviors;
  in response to determining that the number of times satisfies a preset condition, prompting the user to open a smart multi-tab browsing manner; and
  obtaining an instruction for allowing the user to open the smart multi-tab browsing manner.

5. The method according to claim 2, before analyzing a target page to be visited based on the trained learning model so as to determine a target browsing manner from the manner of browsing in a current tab and the manner of browsing in a new tab, further comprising:
  counting a number of times of browsing the target page in a new tab based on the history browsing behaviors;
  in response to determining that the number of times satisfies a preset condition, prompting the user to open a smart multi-tab browsing manner; and
  obtaining an instruction for allowing the user to open the smart multi-tab browsing manner.

6. The method according to claim 3, before analyzing a target page to be visited based on the trained learning model so as to determine a target browsing manner from the manner of browsing in a current tab and the manner of browsing in a new tab, further comprising:
  counting a number of times of browsing the target page in a new tab based on the history browsing behaviors;
  in response to determining that the number of times satisfies a preset condition, prompting the user to open a smart multi-tab browsing manner; and
  obtaining an instruction for allowing the user to open the smart multi-tab browsing manner.

7. An electronic device, comprising a housing, a processor, a memory, a circuit board, and a power circuit, wherein the circuit board is arranged inside a space enclosed by the housing; the processor and the memory are disposed on the circuit board; the power circuit is configured to provide power for respective circuits or components of the electronic device; the memory is configured to store executable program codes; and the processor is configured to run a program corresponding to the executable program codes by reading the executable program codes stored in the memory, so as to perform a page loading method, comprising:
  collecting history browsing behaviors of a user during using a browser, and obtaining visited pages involved in the history browsing behaviors and browsing manners used by the user;
  training a learning model based on the visited pages and the browsing manners used by the user, such that the learning model learns a correspondence relationship between the visited pages and the browsing manners, wherein the browsing manners comprise a manner of browsing in a current tab and a manner of browsing in a new tab;
  in response to receiving a page visiting request, determining a target browsing manner for the target page from the manner of browsing in a current tab and the manner of browsing in a new tab by analyzing the target page to be visited based on the trained learning model; and
  loading the target page according to the target browsing manner.

8. The electronic device according to claim 7, wherein training the learning model based on the visited pages and the browsing manner used by the user comprises:
  analyzing visited pages involved in a plurality of history browsing behaviors, and obtaining characteristic parameters of a plurality of visited pages;
  characterizing the plurality of visited pages with the characteristic parameters, and labeling each of the plurality of visited pages by using a corresponding browsing manner;
  generating a training sample set based on the plurality of labeled visited pages; and
  training the learning model using the training sample set, wherein the learning model is a binary classification model.

9. The electronic device according to claim 8, wherein analyzing visited pages involved in the plurality of history browsing behaviors and obtaining characteristic parameters of the plurality of visited pages comprising:
  for each history browsing behavior, obtaining a URL of the visited page, content of the visited page, a URL of a related page of the visited page and/or content of the related page, wherein, the related page is a page loaded in the current tab and/or a page loaded in another tab before jumping from the current tab to the visited page; and
  generating the characteristic parameters based on the URL of the visited page, the content of the visited page, the URL of the related page of the visited page and/or the content of the related page.

10. The electronic device according to claim 7, wherein, before analyzing a target page to be visited based on the trained learning model so as to determine a target browsing manner from the manner of browsing in a current tab and the manner of browsing in a new tab, the method further comprises:
  counting a number of times of browsing the target page in a new tab based on the history browsing behaviors;
  in response to determining that the number of times satisfies a preset condition, prompting the user to open a smart multi-tab browsing manner; and
  obtaining an instruction for allowing the user to open the smart multi-tab browsing manner.

11. The electronic device according to claim 8, wherein, before analyzing a target page to be visited based on the trained learning model so as to determine a target browsing manner from the manner of browsing in a current tab and the manner of browsing in a new tab, the method further comprises:
  counting a number of times of browsing the target page in a new tab based on the history browsing behaviors;
  in response to determining that the number of times satisfies a preset condition, prompting the user to open a smart multi-tab browsing manner; and obtaining an instruction for allowing the user to open the smart multi-tab browsing manner.

12. The electronic device according to claim 9, wherein, before analyzing a target page to be visited based on the trained learning model so as to determine a target browsing manner from the manner of browsing in a current tab and the manner of browsing in a new tab, the method further comprises:
- counting a number of times of browsing the target page in a new tab based on the history browsing behaviors;
- in response to determining that the number of times satisfies a preset condition, prompting the user to open a smart multi-tab browsing manner; and
- obtaining an instruction for allowing the user to open the smart multi-tab browsing manner.

13. A non-transitory computer-readable storage medium, having stored therein computer programs that, when executed by a processor, perform a page loading method, comprising:
- collecting history browsing behaviors of a user during using a browser, and obtaining visited pages involved in the history browsing behaviors and browsing manners used by the user;
- training a learning model based on the visited pages and the browsing manners used by the user, such that the learning model learns a correspondence relationship between the visited pages and the browsing manners, wherein the browsing manners comprise a manner of browsing in a current tab and a manner of browsing in a new tab;
- in response to receiving a page visiting request, determining a target browsing manner for the target page from the manner of browsing in a current tab and the manner of browsing in a new tab by analyzing the target page to be visited based on the trained learning model; and
- loading the target page according to the target browsing manner.

14. The non-transitory computer-readable storage medium according to claim 13, wherein training the learning model based on the visited pages and the browsing manner used by the user comprises:
- analyzing visited pages involved in a plurality of history browsing behaviors, and obtaining characteristic parameters of a plurality of visited pages;
- characterizing the plurality of visited pages with the characteristic parameters, and labeling each of the plurality of visited pages by using a corresponding browsing manner;
- generating a training sample set based on the plurality of labeled visited pages; and
- training the learning model using the training sample set, wherein the learning model is a binary classification model.

15. The non-transitory computer-readable storage medium according to claim 14, wherein analyzing visited pages involved in the plurality of history browsing behaviors and obtaining characteristic parameters of the plurality of visited pages comprising:
- for each history browsing behavior, obtaining a URL of the visited page, content of the visited page, a URL of a related page of the visited page and/or content of the related page, wherein, the related page is a page loaded in the current tab and/or a page loaded in another tab before jumping from the current tab to the visited page; and
- generating the characteristic parameters based on the URL of the visited page, the content of the visited page, the URL of the related page of the visited page and/or the content of the related page.

16. The non-transitory computer-readable storage medium according to claim 13, before analyzing a target page to be visited based on the trained learning model so as to determine a target browsing manner from the manner of browsing in a current tab and the manner of browsing in a new tab, the method further comprises:
- counting a number of times of browsing the target page in a new tab based on the history browsing behaviors;
- in response to determining that the number of times satisfies a preset condition, prompting the user to open a smart multi-tab browsing manner; and
- obtaining an instruction for allowing the user to open the smart multi-tab browsing manner.

17. The non-transitory computer-readable storage medium according to claim 14, before analyzing a target page to be visited based on the trained learning model so as to determine a target browsing manner from the manner of browsing in a current tab and the manner of browsing in a new tab, the method further comprises:
- counting a number of times of browsing the target page in a new tab based on the history browsing behaviors;
- in response to determining that the number of times satisfies a preset condition, prompting the user to open a smart multi-tab browsing manner; and
- obtaining an instruction for allowing the user to open the smart multi-tab browsing manner.

18. The non-transitory computer-readable storage medium according to claim 15, before analyzing a target page to be visited based on the trained learning model so as to determine a target browsing manner from the manner of browsing in a current tab and the manner of browsing in a new tab, the method further comprises:
- counting a number of times of browsing the target page in a new tab based on the history browsing behaviors;
- in response to determining that the number of times satisfies a preset condition, prompting the user to open a smart multi-tab browsing manner; and
- obtaining an instruction for allowing the user to open the smart multi-tab browsing manner.

* * * * *